US011094486B2

United States Patent
Rodriguez et al.

(10) Patent No.: US 11,094,486 B2
(45) Date of Patent: Aug. 17, 2021

(54) MAGNETIC TRIGGER ARRANGEMENT

(71) Applicant: COGNEX CORPORATION, Natick, MA (US)

(72) Inventors: Saul Sanz Rodriguez, Aachen (DE); Kai Fluegge, Aachen (DE)

(73) Assignee: COGNEX CORPORATION, Natick, MA (US)

( * ) Notice: Subject to any disclaimer, the term of this patent is extended or adjusted under 35 U.S.C. 154(b) by 202 days.

(21) Appl. No.: 16/226,785

(22) Filed: Dec. 20, 2018

(65) Prior Publication Data

US 2020/0203101 A1 Jun. 25, 2020

(51) Int. Cl.

| | |
|---|---|
| ***G06K 7/04*** | (2006.01) |
| ***H01H 36/00*** | (2006.01) |
| ***H01H 9/02*** | (2006.01) |
| ***G06K 7/10*** | (2006.01) |

(52) U.S. Cl.

CPC ..... *H01H 36/0013* (2013.01); *G06K 7/10881* (2013.01); *H01H 9/0214* (2013.01)

(58) Field of Classification Search

CPC ............... H01H 36/0073; H01H 36/00; A61N 36/0073; A61N 1/37; A61N 1/3718

USPC ........................................ 235/462.45, 472.01

See application file for complete search history.

(56) References Cited

U.S. PATENT DOCUMENTS 3,739,310 A 6/1973 Lapointe
4,027,278 A 5/1977 Giannini
4,246,792 A * 1/1981 Matzuk .................... A61B 8/00 73/620
4,977,898 A * 12/1990 Schwarzschild ......... A61B 8/12 600/445
6,198,956 B1 * 3/2001 Dunne ..................... A61B 8/10 600/407
8,025,236 B2 9/2011 Mangaroo et al.
8,258,902 B2 9/2012 Lee
8,704,622 B2 4/2014 Koepsell
9,460,875 B2 10/2016 Penning et al.
9,754,739 B2 9/2017 Honda et al.
2007/0219409 A1 9/2007 Shimizu et al.
2008/0053805 A1 3/2008 Wanek
2012/0319482 A1 12/2012 Budampati et al.
2016/0343497 A1 11/2016 Clark et al.
2017/0172568 A1 6/2017 Nicholas
2017/0250041 A1 8/2017 Bergum

FOREIGN PATENT DOCUMENTS

CN 107017120 A 8/2017

* cited by examiner

*Primary Examiner* — Daniel St. Cyr
(74) *Attorney, Agent, or Firm* — Quarles & Brady LLP

(57) ABSTRACT

A trigger arrangement for a scanning system can include a sealed housing configured to support a scanning device, a trigger, and an actuation device configured to control functionality of the scanning device. A first magnet can be positioned outside of the sealed housing and can be configured to be selectively moved by the trigger. A second magnet configured to be repelled by the first magnet can be positioned inside of the sealed housing. A connecting member that supports the second magnet can be configured to transfer force from the second magnet to the actuation device. Some configurations can provide tactile feedback to a user when the trigger is used.

20 Claims, 10 Drawing Sheets

118 22 116 98 76 96 68 60 110 112 66 30 92 64 32 62 24 100 86 78 26 28 24a 70 84 134 90

MAGNETIC TRIGGER ARRANGEMENT

CROSS-REFERENCE TO RELATED APPLICATIONS

Not applicable

STATEMENT REGARDING FEDERALLY

SPONSORED RESEARCH OR DEVELOPMENT

Not applicable.

BACKGROUND OF THE INVENTION

In different settings, it may be useful to provide scanning devices (i.e., "scanners") that can be manually actuated in order to trigger a desired action. For example, some scanners can be configured as handheld devices that are configured to optically scan a barcode or other symbol upon manual actuation of a trigger.

In some settings, it may be useful to isolate internal components of a scanner from the environment. For example, some environments may include water, oil, dust, or other contaminants that can tend to degrade performance of electronics of a scanner. Accordingly, for example, it may be useful to protect internal components of a scanner with a housing that is configured to exclude environmental substances.

BRIEF SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Some embodiments of the invention can include a scanning system with a sealed housing that is configured to support a scanning device, a trigger that is supported by and external to the sealed housing, a first magnet that is supported by the trigger, and a second magnet that is internal to the sealed housing and aligned with the first magnet. An actuation device within the sealed housing can be configured to be actuated to control one or more operations of the scanning device. A connecting member can extend between the second magnet and the actuation device. The trigger can be configured to move relative to the sealed housing to move the first magnet towards the second magnet, in order to move the second magnet away from the first magnet and thereby transmit an actuation force to the actuation device via the connecting member.

Some embodiments of the invention include a scanning system with a sealed housing, a scanning device that is configured to be detachably supported by the sealed housing, and a manual trigger that is supported by the sealed housing. An actuation device can be enclosed within the sealed housing and can be configured to be actuated to control one or more operations of the scanning device. A magnetic arrangement can be configured to actuate the actuation device. The magnetic arrangement can include a first magnet having a first pole, the first magnet being external to the sealed housing and being configured to be selectively moved by the manual trigger, and a second magnet having a second pole configured to be repelled by the first pole, the second magnet being enclosed by the sealed housing. A connecting member that supports the second magnet within the sealed housing can be configured to move in order to actuate the actuation device when the manual trigger moves the first magnet towards the sealed housing.

Some embodiments of the invention include a trigger arrangement for a scanning system that includes a scanning device, a sealed housing that is configured to support the scanning device, and an actuation device that is configured to control functionality of the scanning device. The trigger arrangement can include a trigger that is configured to be manually moved relative to the sealed housing, a first magnet having a first pole, the first magnet being external to the sealed housing and being configured to be selectively moved by the trigger, and a second magnet having a second pole configured to be repelled by the first pole, the second magnet being enclosed by the sealed housing. The trigger arrangement can further include a connecting member that supports the second magnet within the sealed housing and that is configured to actuate the actuation device when the trigger moves the first magnet towards the second magnet.

The following description and annexed drawings set forth in detail certain illustrative aspects of the present invention. These aspects are indicative, however, of but a few of the various ways in which the principles of the invention may be employed and the present invention is intended to include all such aspects and their equivalents. Other advantages and novel features of the present invention will become apparent from the following detailed description of the invention when considered in conjunction with the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
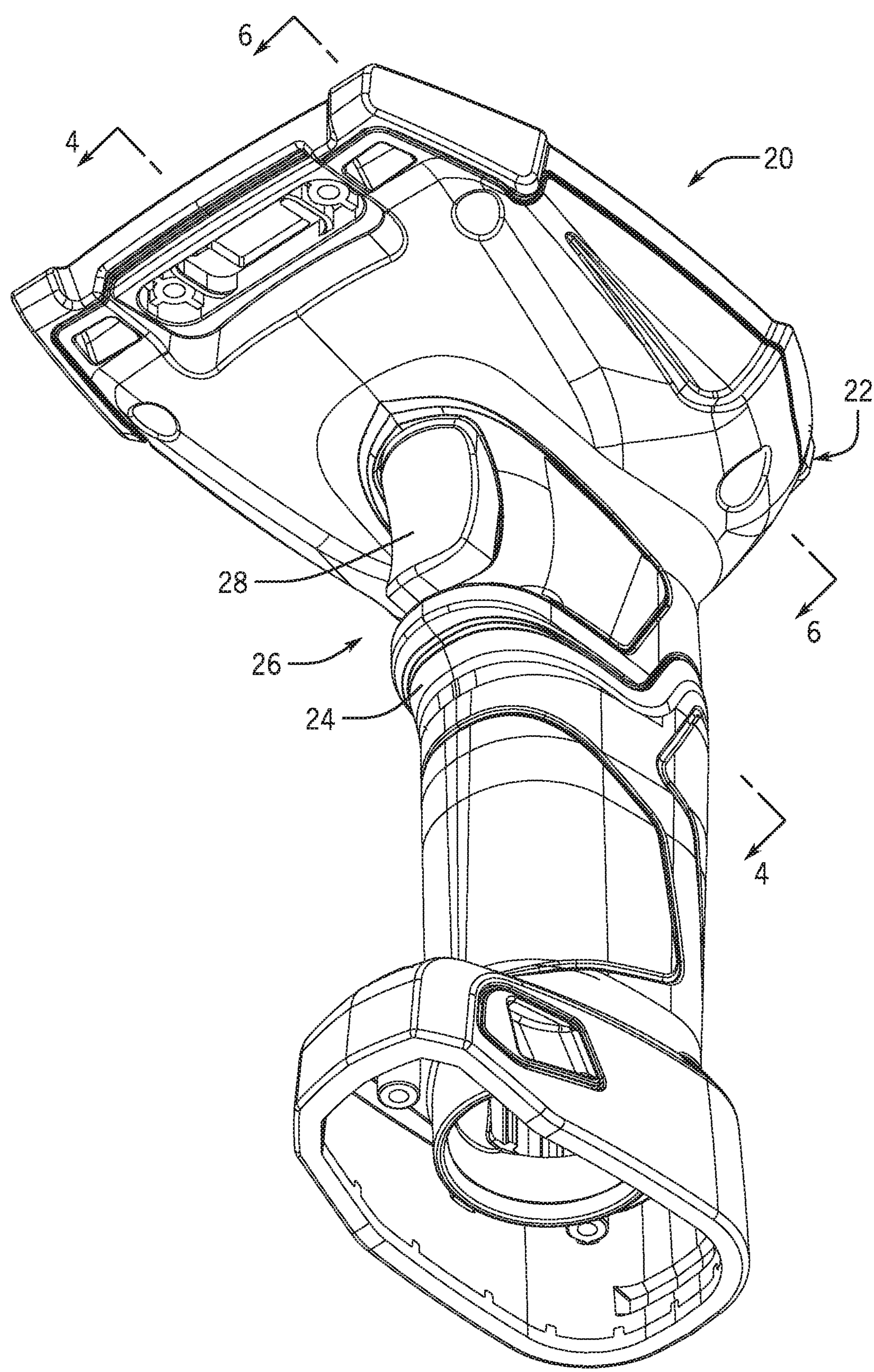
FIG. 1 is an isometric bottom view of a scanner according to an embodiment of the invention, with a manual trigger.

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

Unless otherwise specified or limited, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

Disclosed herein is a trigger arrangement for use with a sealed housing. In some embodiments, the trigger arrangement can have a trigger that is mounted externally to the sealed housing and that is configured to actuate an actuating device within the sealed housing via a magnetic arrangement.

Some embodiments of the trigger arrangements illustrated in the figures are configured to for use with sealed handheld scanning devices, such as handheld barcode scanners. In other embodiments, however, trigger arrangements in accordance with the present disclosure can be configured for use with other systems that utilize sealed housings, including other handheld devices.

Some embodiments of the trigger arrangement of the present invention can enable a force that is manually applied to a trigger outside of a sealed housing to be transferred to the inside of the sealed housing. In some embodiments the force can be transferred into the sealed housing using at two or more magnets, one positioned inside the housing and one positioned outside of the housing. For example, two magnets can be configured to be axially-aligned and oriented such that their respective north or south poles are facing each other, thereby providing a repulsive force. The repulsive force between the two magnets can be used to transfer to the interior magnet a force that is applied to the exterior magnet, in order to actuate a switching device, such as a mechanical or tactile switch or any other suitable switching mechanism. Further, in some cases the two magnets can transfer tactile feedback from an actuation device or from the switching device back to the user.

In some embodiments, a trigger arrangement as disclosed herein can be used with sealed housings without necessarily requiring penetration of the trigger into the sealed housing, incorporation of a separate sealing material around the trigger, or the use of deforming material, such as flexible membranes, on or around the trigger. In some embodiments, such an arrangement can be advantageous in reducing wear effects and improving resistance to the effects of oil or other contaminants. In some embodiments, a trigger arrangement can be used with sealed housings that have one or more commercial protection ratings, including, for example, Ingress Protection 67 ("IP67") rating for sealed housings.

In some embodiments of the invention, a system for actuating a switch inside a sealed enclosure can include one magnet that is inside the sealed enclosure and connected (e.g., mechanically) with the switch, and one magnet that is outside the sealed enclosure and connected (e.g., mechanically) with a movable button or other trigger. Force applied to the moveable button can be transferred, via the magnets, through the non-metal or non-magnetic wall of the enclosure, to the switch, so that the electrical state of the switch is changed.

In some embodiments of the inventions, the north or the south poles of inner and outer magnets can be oriented towards each other. Accordingly, as a trigger is pushed (or pulled) to move the outer magnet towards the inner magnet, the repulsion between the magnets can cause an actuation of an actuation device (e.g., a switch). In a similar way, for example, the magnets can also transfer tactile feedback to the trigger upon actuation of the switch or other events.

In some embodiments, a biasing arrangement can be used to bias a trigger or other component in a particular direction. For example, a spring outside a sealed enclosure can bias a trigger to a rest position. Or a spring inside a sealed enclosure can be configured to push a magnet away from a switch. The force applied by this spring can then be transferred to the trigger through the wall of the enclosure to keep the button in a defined rest position. In some cases, the switch can provide tactile feedback, and the magnets can transfer this tactile feedback to the trigger on the outside of the sealed enclosure.

In some embodiments, a system for triggering an event such as a code reading process on a handheld device can include a magnetic sensor, such as a Hall Effect sensor or Reed switch, that is inside a sealed enclosure, and a magnet that is outside the sealed enclosure and mechanically connected to a movable trigger. Displacement of the trigger towards the sensor can activate any one of a variety of operations, such as an image capturing and code reading process on the handheld device, by moving the magnet within appropriate range of the sensor. In some embodiments, a spring system can be configured to push the trigger away from the sensor towards a rest position.

FIG. 1 illustrates aspects of an example scanning system that includes a scanner 20. In the embodiment illustrated, the scanner 20 includes a body 22 having a pistol-grip configuration that is configured to support a scanning device (not shown). The body 22 includes a sealed housing 24 that is configured to protect components housed therein, including an actuation device 32 (see, e.g., FIG. 3), so that the components are isolated from the environment exterior to the sealed housing 24. The body 22 also supports a trigger arrangement 26 for operating the attached scanning device.

In different embodiments, different trigger arrangements can be used with the scanner 20. In the embodiment illustrated, as shown in particular in FIGS. 3-5B, 7 and 8, the trigger arrangement 26 includes a pistol-style trigger 28 that is movably coupled to the exterior of the sealed housing 24 (see, e.g., FIG. 4), and a connecting member 30 that is mounted within the sealed housing 24. Generally, the connecting member 30 is configured to be movable in response to movement of the trigger 28, due to a magnetic arrangement between the trigger 28 and the connecting member 30. In this way, for example, the trigger 28 can be used to move the connecting member 30 to engage and actuate the actuation device 32 (see, e.g., FIG. 3), to control one or more functions of the scanning device.

In some embodiments, a scanning device secured to the body 22 can be a barcode scanner. In some embodiments, the scanning device can be a different device that is operable to optically or otherwise scan other symbols. In some embodiments, a scanning device can be removably coupled to the body 22. In some embodiments, a scanning device can be permanently fixed to the body 22.

Figure 2:
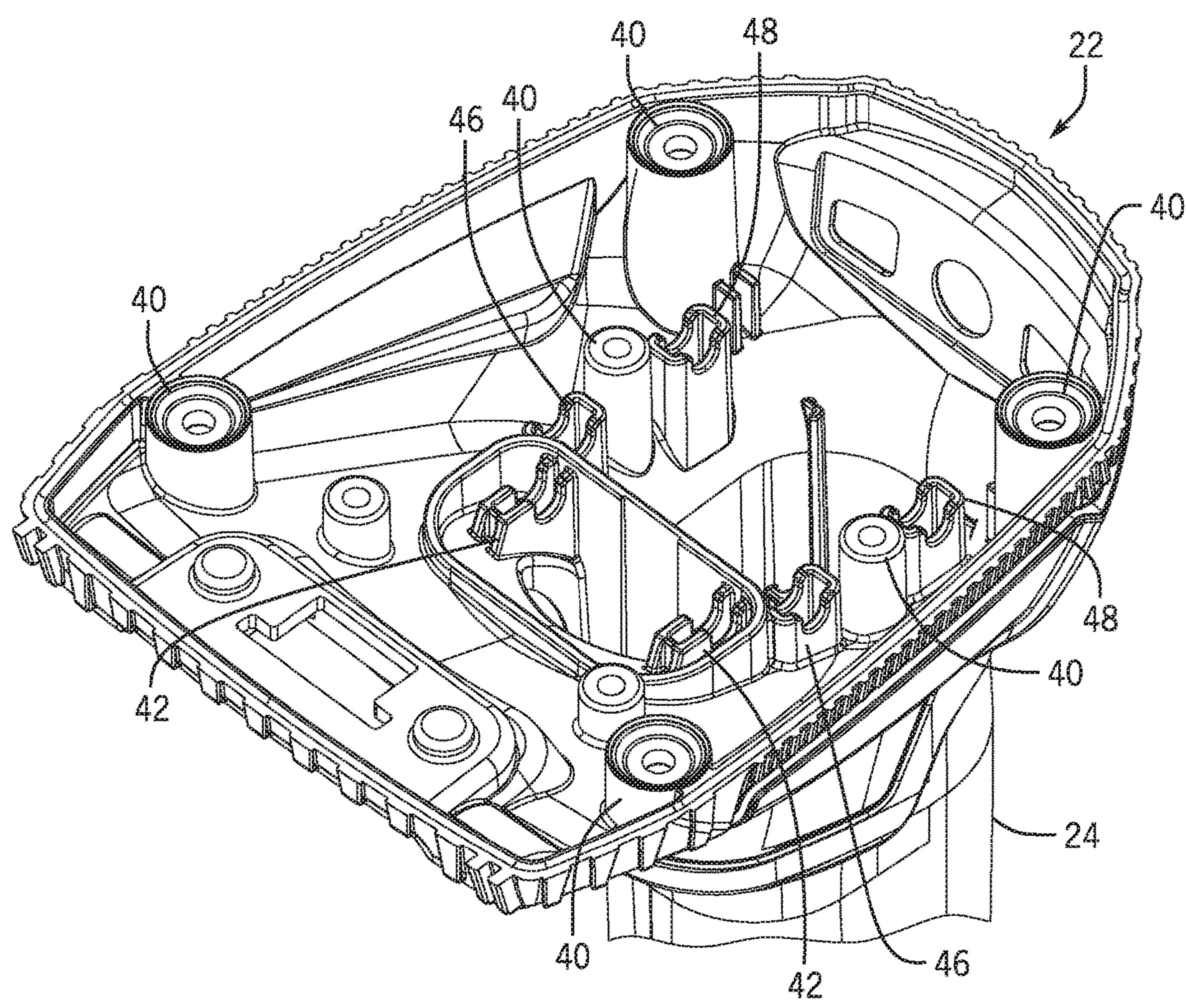
FIG. 2 is an isometric top view of a body of the scanner of FIG. 1.

In different embodiments, a body can include different support features for a scanner or other device, for a trigger arrangement, or for other components. Referring in particular to FIG. 2, for example, the body 22 includes mounts 40 on the sealed housing 24 which can provide an interface for coupling a scanning device or other component to the body 22. The body 22 also includes trigger supports 42, which are positioned on the sealed housing 24 to support the manual trigger 28. The trigger supports 42 are collectively configured to suspend the trigger 28 on the exterior of sealed housing 24, in order to allow the trigger 28 to rotate with respect to the sealed housing 24.

In the embodiment illustrated, the body 22 further includes connecting-member supports that are configured to rotatably support the connecting member 30 relative to the sealed housing 24. In different embodiments, different types of connecting-member supports are possible. In the illustrated embodiment, for example, the body 22 includes a first pair of connecting-member supports 46 and a second pair of connecting-member supports 48 that are collectively configured to rotatably suspend the connecting member 30 within the interior of sealed housing 24.

In some embodiments, the trigger supports 38, the mounts 40, or other support features can be integrally formed in the sealed housing 24. In some embodiments, the trigger supports 38, the mounts 40, or other support features can be a separate part coupled to the sealed housing 24.

Referring again to FIGS. 3 and 4, features of the trigger arrangement 26 are illustrated, along with other components positioned within the sealed housing 24. In the embodiment illustrated, the trigger 28 is formed from a rigid, non-flexible material and includes a pivoting portion 60, and a pressing surface 62 that configured to be pressed by the user. The pivoting portion 60 of the trigger is configured to rotatably engage the trigger supports 42 of the body 22 (see FIG. 2), thereby rotatably connecting the trigger 28 to the sealed housing 24. The trigger 28 is also configured to support a first magnet 64, so that the magnet 64 can be selectively moved by the trigger 28.

Usefully, as also discussed below, the trigger 28 is configured not to penetrate into the sealed interior of the sealed housing 24 when the trigger 28 is operated. In this regard, for example, the scanner 20 can be easily manually operated by trigger pulls, without a corresponding exposure of external components to exterior contaminants. Further, in some embodiments, the use rigid material, rather than flexible (e.g., rubber) membranes for the trigger 28 can increase the lifespan of the trigger 28 generally.

In some embodiments, external biasing arrangements can be configured to return a trigger to a rest orientation after the trigger is actuated by a user. In the embodiment illustrated, for example, the trigger arrangement 26 includes a biasing arrangement 66 that is configured to provide a return force to the trigger 26. This return force, for example, can rotate the trigger 28 substantially away from the sealed housing 24 into a rest (e.g., un-pressed) position, when a user is not urging the trigger 28 towards the housing 24. In the illustrated embodiment, the biasing arrangement 66 includes a hairpin-style torsion spring 68 that is positioned on the pivoting portion 60 of the trigger 28, in engagement with the sealed housing 24. Accordingly, the torsion spring 68 is can be compressed when the trigger 28 is compressed and can thereby bias the trigger 28 towards the rest position. Complementing the spring, the trigger 28 also includes a stop member 70, which can engage an extension 24*a* of the sealed housing 24 (see FIG. 4) to stop the trigger 28 in the rest position.

In other embodiments, other arrangements are possible. For example, a biasing arrangement can use a compression spring, a magnetic arrangement, or any other suitable mechanism to bias a trigger into a rest position. In some embodiments, including as illustrated, a biasing arrangement can be configured to provide a degree of tactile feedback when a trigger is pressed by a user.

In different embodiments, different types of connecting members can be used. In the embodiment illustrated, for example, the connecting member 30 is configured as a hanging, pivoting linkage 76 that supports a second magnet 78. The pivoting linkage 76 is rotatably supported at two distinct axes by the connecting-member supports 46, 48, and is configured to be moved by the second magnet 78, via force generated by the first magnet 64, to selectively actuate the actuation device 32. As illustrated, the hanging, pivoting linkage 76 effectively operates as a four-bar linkage. In other embodiments, other four-bar linkage arrangements, or other linkage arrangements generally, can be used.

Figure 4:
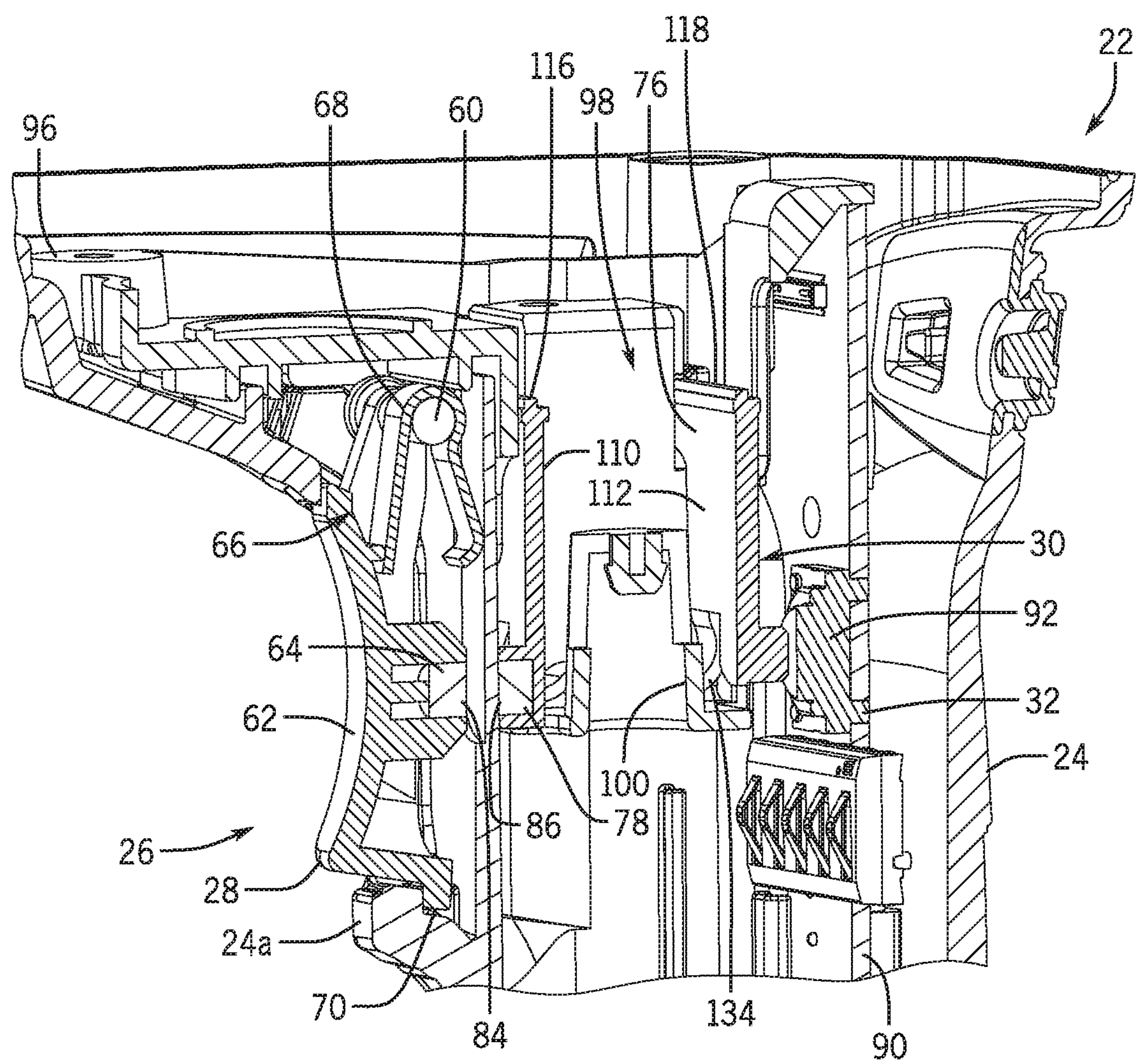
FIG. 4 is a cross-sectional, isometric, partial view of the scanner of FIG. 1, taken along plane 4-4 of FIG. 1, with the scanner in a non-actuated configuration.

In particular, in the embodiment illustrated, the first magnet 64 and the second magnets 78 are respectively positioned on the trigger 28 and the pivoting linkage 76. Accordingly, when the trigger 28 is in the rest position, the first and second magnets 64, 78 are substantially in axial alignment with each other. Further, the first and second magnets 64, 78 are oriented so that a first magnetic moment of the first magnet 64 is oriented in substantially the opposite direction of a second magnetic moment of the second magnet 78, so that the second magnet 78 is generally repelled due to proximity of the first magnet 64. For example, as illustrated in FIG. 4 in particular, a first magnetic pole 84 of the first magnet 64 can be arranged to face a second magnetic pole 86 of the second magnet 78 that has the same magnetic polarity as the first magnetic pole 84.

In different embodiments, a connecting member can be configured to actuate different types of actuation devices. In the embodiment illustrated, the actuation device 32 is disposed on a printed circuit board ("PCB") 90 that is positioned inside the sealed housing 24. In particular, in the embodiment illustrated, the PCB 90 is positioned on substantially the opposite side of the sealed housing 24 than is the trigger 28, so that the connecting member 30 is positioned between the trigger 28 and the PCB 90. Also in the illustrated embodiment, the actuating device 32 includes a tactile switch 92 that is configured to be actuated in response to contact with the connecting member 30, and to provide tactile feedback to the user upon actuation, via the connecting member 30. In other embodiments, an actuating device may be otherwise configured, including as a different switching mechanism that may or may not provide tactile feedback. In some embodiments, a resonant frequency of a connecting member, such as the connecting member 30, can be configured to amplify or otherwise modify tactile feedback.

Figure 3:
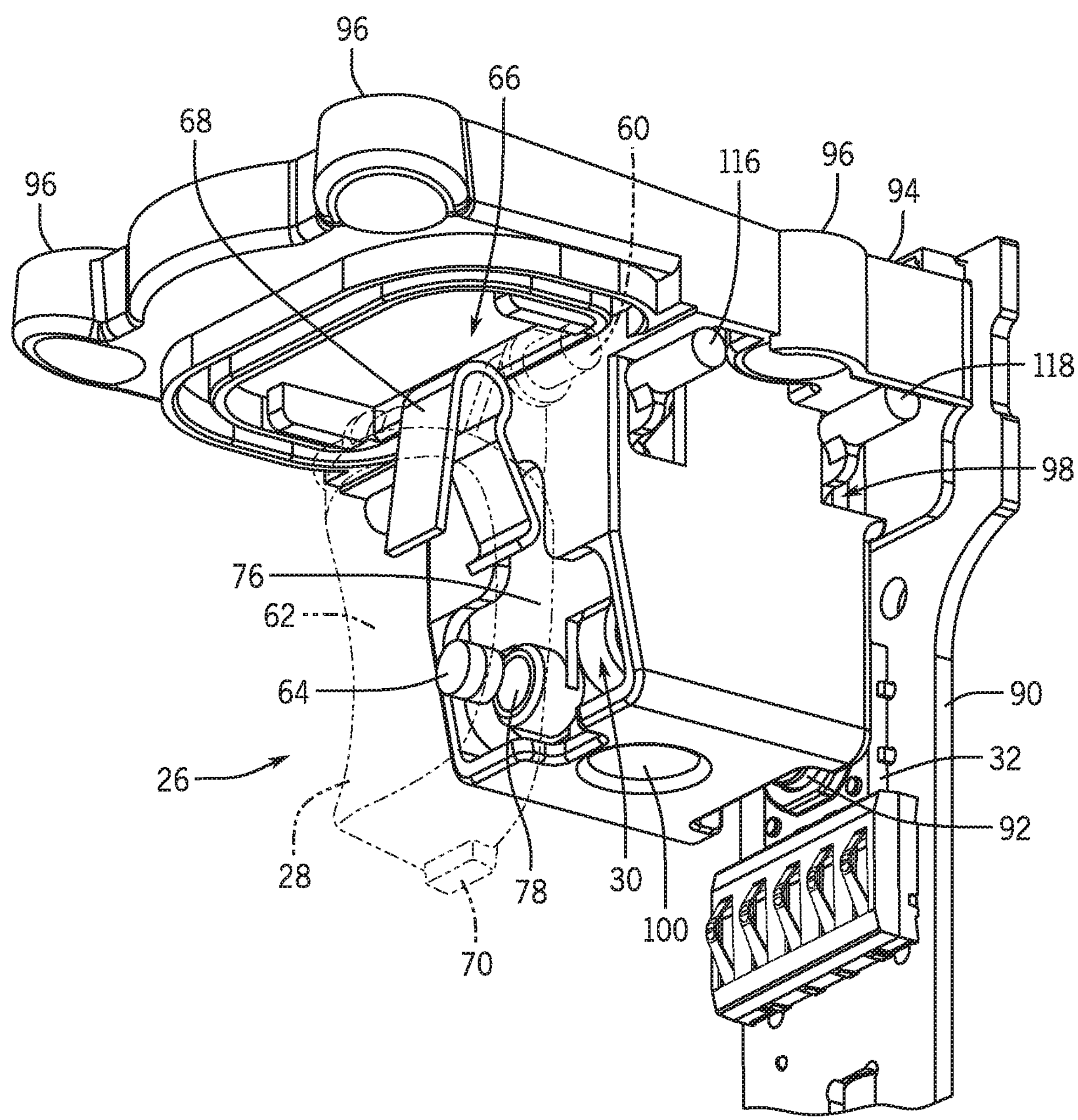
FIG. 3 is an isometric partial view of certain internal components of the scanner of FIG. 1, with the manual trigger rendered transparently.

In some embodiments, a connecting member can be configured to move through or around other components that may be disposed between a trigger and an actuating device. In the embodiment illustrated, for example, as illustrated in particular in FIG. 4, the sealed housing 24 also encloses a chassis 94 that has chassis mounts 96 and a central recess 98 with a central support 100. In some arrangements, for example, the chassis 94 can support components such as attachment devices, scanning engines, batteries, or any other element to be housed within or otherwise supported by the sealed housing 24. As illustrated in FIGS. 3 and 4, for example, the pivoting linkage 76 extends within and through the central recess 98, and around the central support 100.

In some embodiments, a connecting member can be configured to transmit force across and around other structures. For example, in the embodiment illustrated, the connecting member 30 is configured to transmit actuation and feedback forces between the actuation device 32 and the trigger arrangement 26, despite the intervening structures of the chassis 94. Accordingly, as also discussed above and below, the connecting member 30 is configured to extend into and through the central recess 98 and to extend around the central support 100.

Figure 5A:
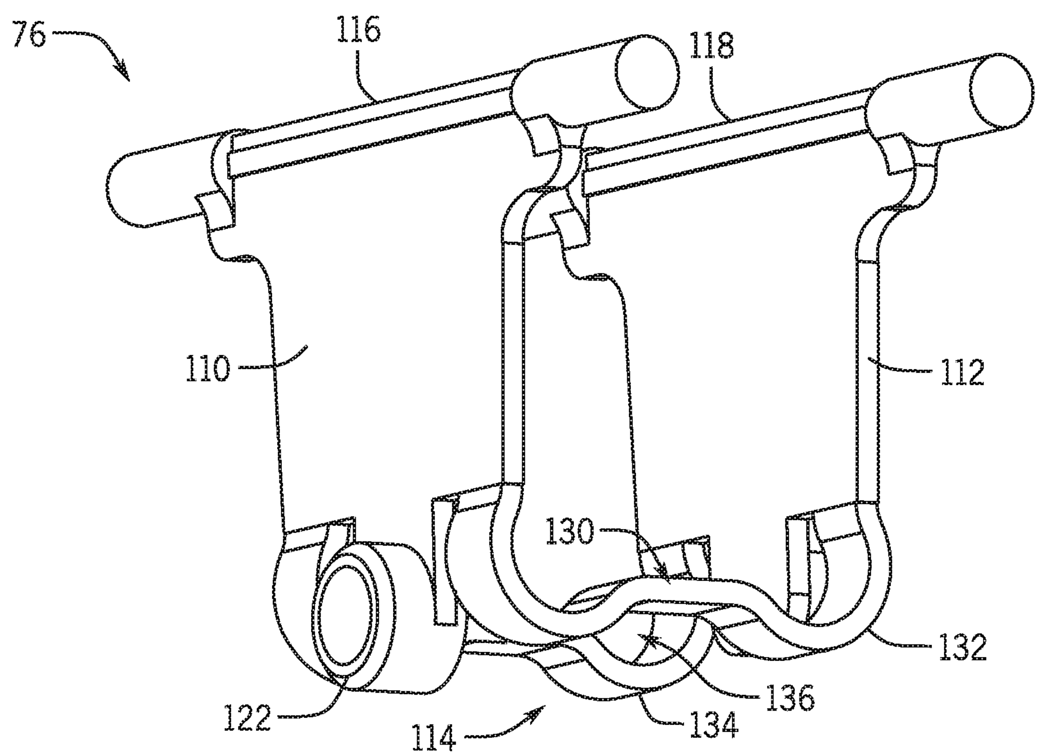
FIGS. 5A and 5B are isometric front and rear views of a hanging linkage of the scanner of FIG. 1.
Figure 5B:
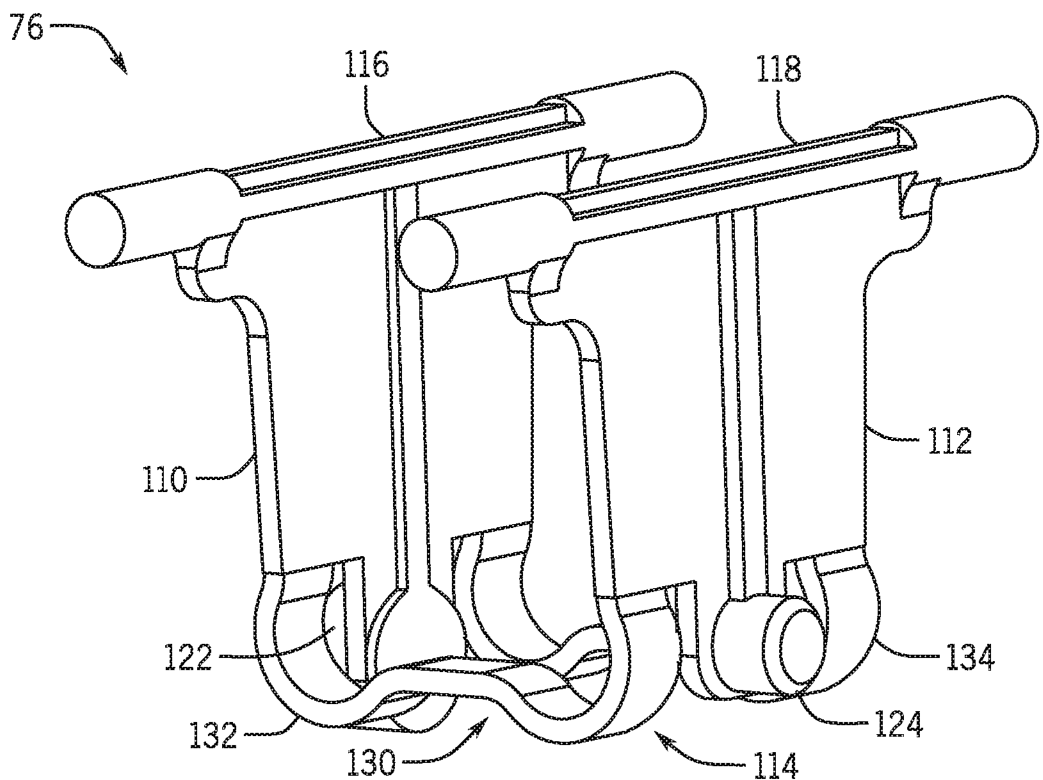
Figure 6:
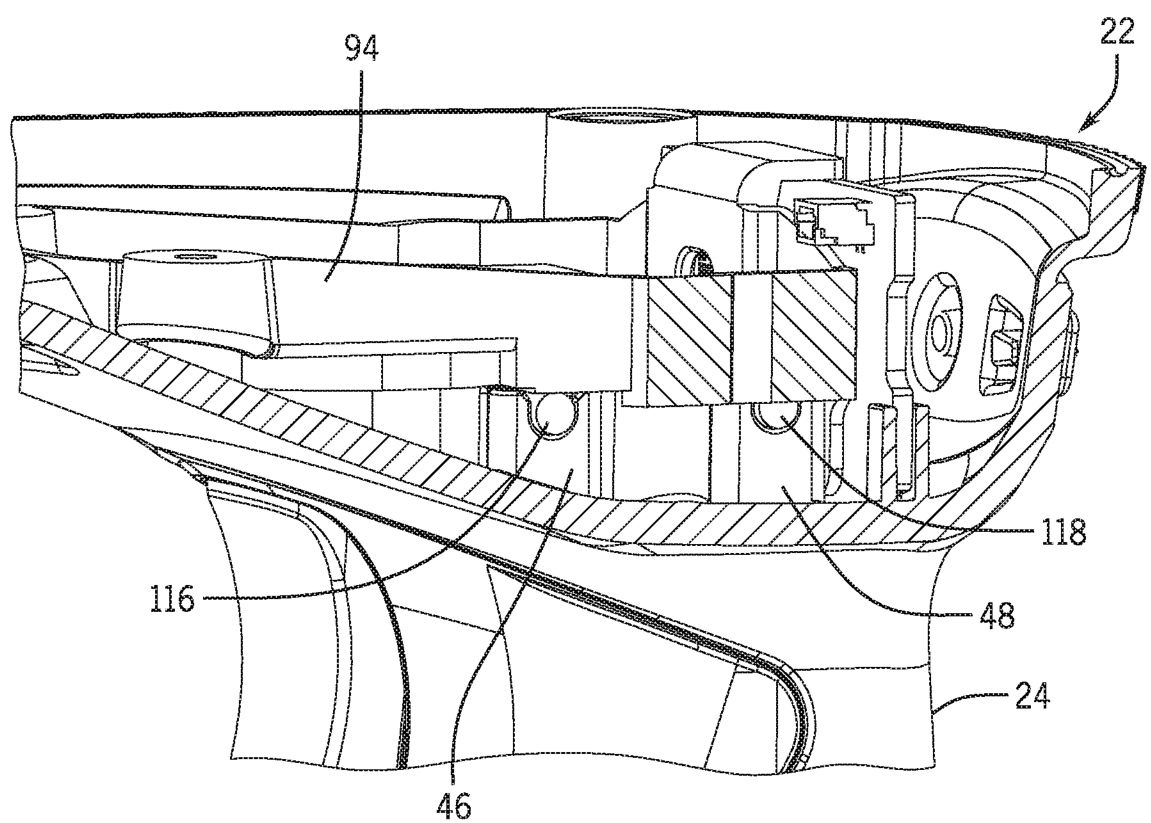
FIG. 6 is a sectional, isometric, partial view of the scanner of FIG. 1, taken along plane 6-6 of FIG. 1.

As also noted above, in different embodiments, different configurations for a connecting member are possible. As illustrated in FIGS. 5A and 5B in particular, For example, the pivoting linkage 76 includes a first pivot arm 110, a second pivot arm 112, and a bridge portion 114 that connects a lower portion of the first pivot arm 110 to a lower portion of the second pivot 112. A first pivoting portion 116 and a second pivoting portion 118 are provided at upper portions of the first pivot arm 110 and the second pivot arm 112, respectively. As illustrated in FIG. 6, for example, the first pivoting portion 116 is dimensioned to rotatably engage the first pair of connecting-member supports 46 and the second pivoting portion 118 is dimensioned to rotatably engage the second pair of connecting-member supports 48 so that the pivoting linkage 76 generally hangs below the connecting-member supports 46, 48 within the sealed housing 24.

In different embodiments, a connecting member can include support features of various configurations to support a magnet, and engagement features of various configurations to engage a switch or other actuation device. Referring again to FIGS. 5A and 5B, for example, the lower portion of the first pivot arm 110 includes a magnet retainer 122 that is configured to receive the second magnet 78. Similarly, the lower portion of the second pivot arm 112 includes an actuation protrusion 124 that extends outwardly from the second pivot arm 112 away from the first pivot arm 110 and that is configured to selectively actuate the actuation device 32.

In the embodiment illustrated, the actuation protrusion 124 is positioned in substantial axial alignment with the magnet retainer 122. In some arrangements, this configuration, in combination with the dual-pivot suspension of the pivoting linkage 76 via the first and second pivot arms 110, 112, can allow the pivoting linkage 76 to transmit force substantially linearly between the trigger 28 and the actuation device 32. This may be useful, for example, in order to provide a relatively extended operational lifespan for the connecting member 30. For example, the prescribed movement of the pivoting linkage 76, as supported by the connecting-member supports 46, 48 may generally minimize lateral movements that could significantly stress the relevant structures. As a result, for example, the pivoting linkage 76 may exhibit an operational lifespan of more than 10 million cycles.

In other embodiments, other configurations are possible. In some embodiments, for example, a hanging (or other) linkage can be configured to transmit motion substantially non-linearly. In some embodiments, a hanging (or other) linkage can be formed from multiple distinct members, to provide force transmission similarly to, or differently from, the pivoting linkage 76. In some embodiments, a connecting member can be formed as structures other than linkages.

In some embodiments, a connecting member can be configured to operate as a resilient spring when subjected to actuation force from a trigger. In the illustrated embodiment, for example, the bridge portion 114 of the pivoting linkage 76 includes a spring portion 130 with a first spring arm 132 and a second spring arm 134, each of which is shaped as a convolute spring. In general, the spring portion 130 can provide a return force that can provide tactile feedback, such as a "click" response, to a user upon sufficient actuation of the trigger 28, as well as assisting in returning the trigger 28 to the rest position. As also noted above, in some embodiments, a resonant frequency of the pivoting linkage 76 (or other connecting member) can be selected in order to appropriately amplify, or otherwise modify, the click response.

In the embodiment illustrated, the first spring arm 132 and the second spring arm 134 extend between the first and second pivots 110, 112, and are positioned on opposite sides of the pivoting linkage 76 from each other, so that a central opening 136 is defined by the first pivot arm 110, the second pivot arm 112, the first spring arm 132, and the second spring arm 134. As also discussed above, the central opening 136 is dimensioned to permit the central support 100 of the chassis 94 to extend through the pivoting linkage 76 (see FIG. 4).

Figure 7:
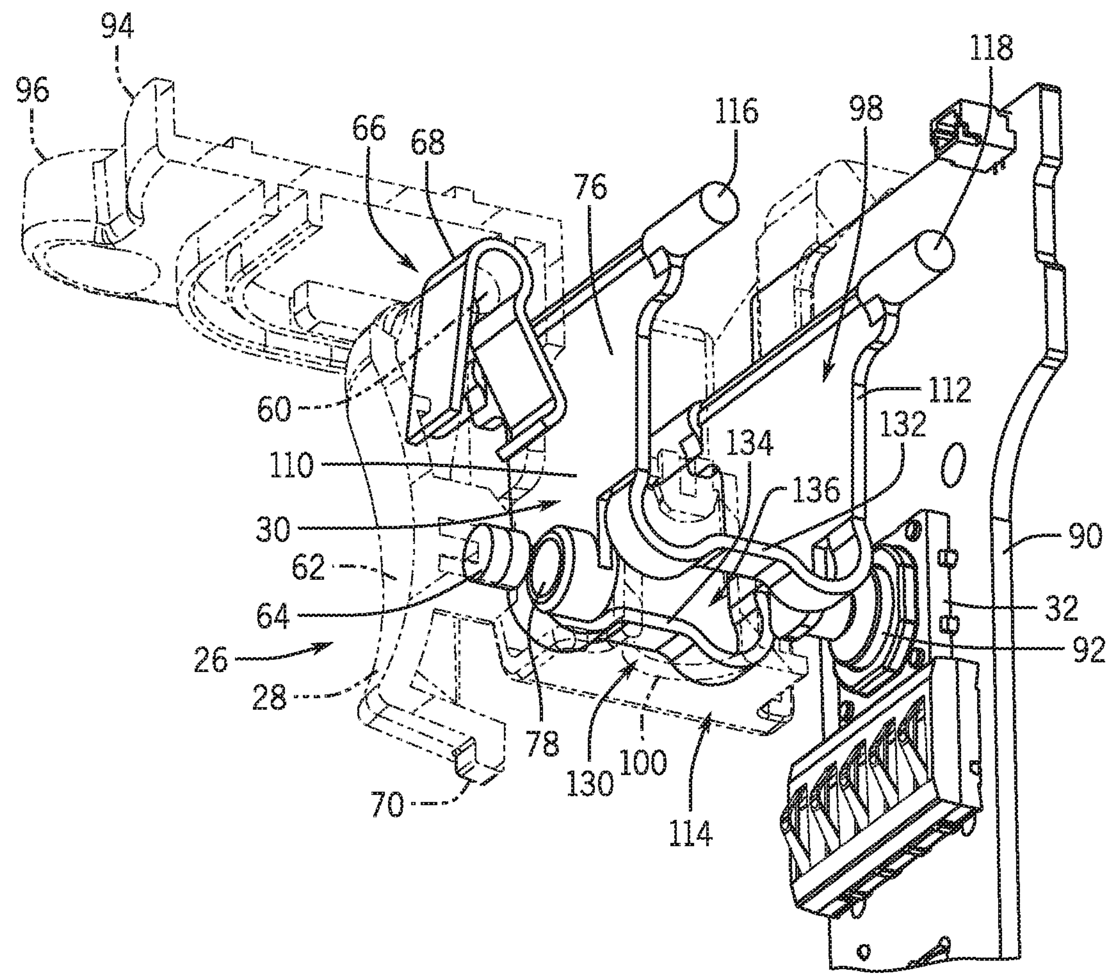
FIG. 7 is an isometric partial view of certain internal components of the scanner of FIG. 1 with the scanner in a non-actuated configuration, and with the manual trigger and a chassis rendered transparently and sectioned along plane 4-4 of FIG. 1.
Figure 8:
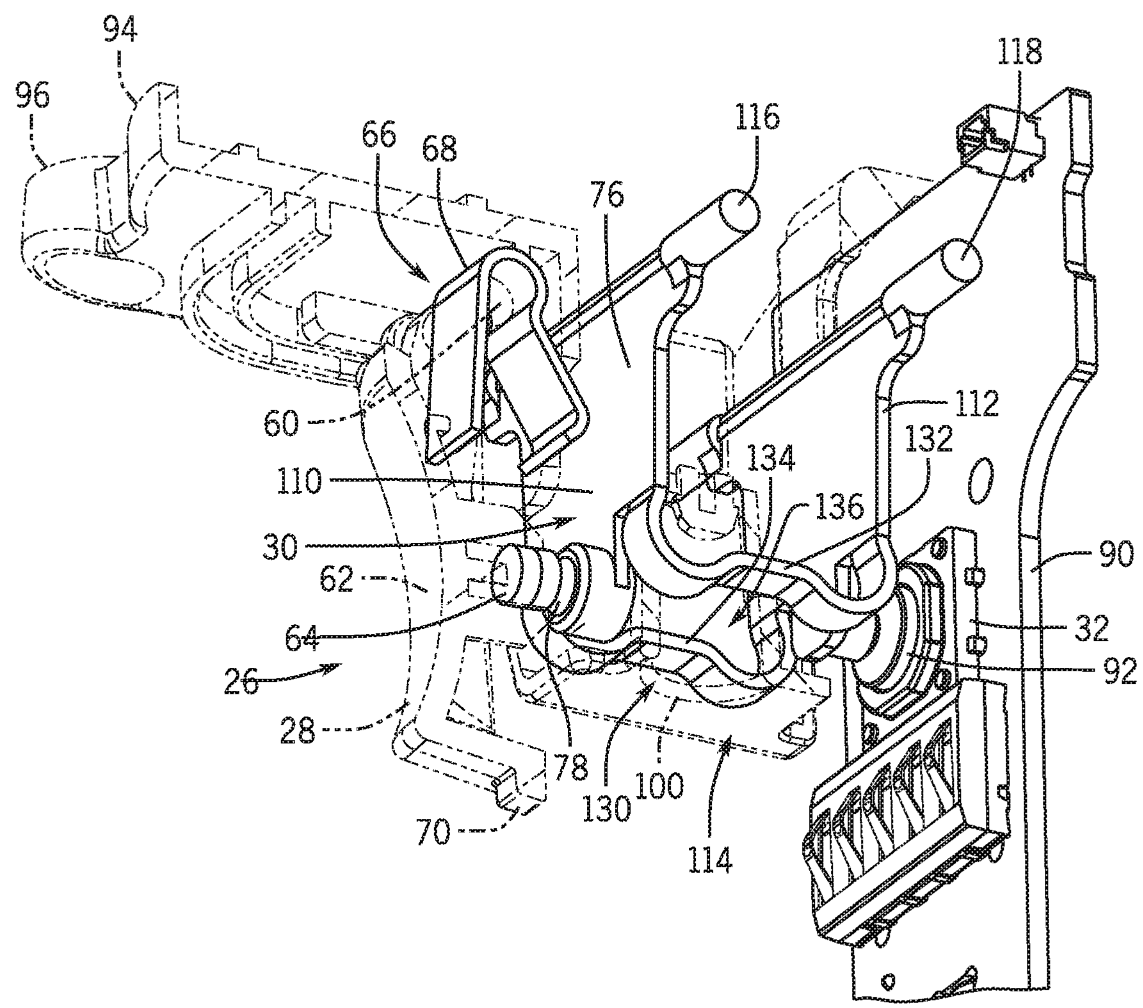
FIG. 8 is a similar view as FIG. 7, with the scanner in an actuated configuration.

In some arrangement, the spring portion 130 can provide sufficient flexibility to allow the first and second pivots 110, 112 to be simultaneously rotated about the first and second pairs of connecting-member supports 46, 48, respectively, between an unactuated configuration and an actuated configuration (See FIGS. 7 and 8). As also noted above, the simultaneous rotation of the first and second pivots 110, 112 from the unactuated configuration to the actuated configuration can result in a substantially linear translation of the magnet retainer 122 and the actuation protrusion 124 toward the actuation device 32 and away from the trigger 28.

In other embodiments, a connecting member can include other structures which can enable the connecting member to actuate an actuation device when a magnetic (or other) arrangement applies a force to the connecting member. For example, in some embodiments, a connecting member can include a coil or other spring, a linkage other than the pivoting linkage 76, a slider, or other structures. In some embodiments, a pivoting linkage may not include a central opening similar to the central opening 136.

An example operation of the trigger arrangement 26 to activate the scanner 20 is illustrated in FIGS. 7 and 8. In a first operating configuration, as illustrated in FIG. 7, the trigger 28 is maintained in the rest position by the torsion spring 68, and the pivoting linkage 76 hangs in the unactuated configuration. With the trigger 28 in the rest position, in the illustrated arrangement, the trigger 28 is arranged so that the first magnet 64 is disposed with a maximum separation between the first magnet 64 and the actuation device 32 mounted on the PCB 90. Similarly, with the pivoting linkage 76 in the unactuated configuration, in the illustrated arrangement, the first and second pivot arms 110, 112 are arranged so that the actuation protrusion 124 is spaced apart from, or at least is not operationally engaged with, the actuation device 32.

When a user applies pressure to the pressing surface 62 of the trigger 28, with sufficient force to overcome the torsion spring 68, the first magnet 64 can be moved by the trigger 28 towards the sealed housing 24 and the second magnet 78. As the first magnet 64 moves towards the second magnet 78, the repulsive force between the first and second magnets 64, 78 increases, thereby increasing the pushing force applied by the second magnet 78 onto the first pivot arm 110 of the pivoting linkage 76 in a direction that is substantially perpendicular to the moment arm between the second magnet 78 and the first pivoting portion 116.

The pushing force on the pivoting linkage 76, applied by the first magnet 64, can continue as the trigger 28 is further depressed, thereby causing the first pivot arm 110 to rotate about the first pivoting portion 116 towards the actuated configuration. Further, the force exerted on the pivoting linkage 76 by the second magnet 78 can be transferred to the second pivot arm 112 through the bridge portion 114, so that the first pivot arm 110 and second pivot arm 112 can pivot simultaneously. As also discussed above, in the illustrated embodiment, this can move the actuating protrusion 124 toward the actuation device 32 in a substantially linear path.

As the user continues to depress the trigger 28, the movement of the pivoting linkage 76 can continue until the pivoting linkage 76 reaches the actuated configuration, as illustrated in FIG. 8. Thus, actuating the trigger 28 can move the pivoting linkage 76 to cause the actuating protrusion 124 to operationally engage and actuate the actuating device 32.

In different embodiments, the specific engagement of a connecting member, such as pivoting linkage 76, with an actuation device can vary. For example, in the embodiment illustrated, the actuation device 32 includes a tactile switch 92. Accordingly, movement of the pivoting linkage 76 may momentarily pause when the actuating protrusion 124 initially contacts the tactile switch 92. With continued movement of the trigger 28, the actuating protrusion 124 can then apply an increasing force onto the tactile switch 92, until the minimum force required to actuate the tactile switch 92 is overcome. The tactile switch 92 can then "click" into an actuated state, potentially allowing the pivoting linkage 76 to rapidly move over a short distance into the actuated configuration.

In some embodiments, force from this "click," or from other reactions to engagement with, or actuation of, the actuation device 32, can be translated by the pivoting linkage 76 back to the trigger 28. In some embodiments, the pivoting linkage 76 can accordingly help to provide a noticeable tactile feedback to a user, which can confirm for the user that the tactile switch 92 has been appropriately engaged. In some embodiments, the spring portion 130 of the pivoting linkage 76 can help to accentuate this feedback, such as by compressing and then relaxing through the ongoing engagement with the actuation device 32. In some embodiments, the tactile switch 92 or other components can similarly provide an audible feedback.

In some embodiments, once the pivoting linkage 76 reaches the actuated configuration, the trigger 28 may be permitted some degree of additional rotation before reaching a fully actuated configuration. For example, the displacement of the second magnet 78 may result in the pivoting linkage 76 reaching the actuated configuration before the trigger 28 has covered the full possible range of movement for the trigger 28. In this regard, for example, a portion of the body 22, rather than repulsive force from the second magnet 78, may ultimately block rotation of the trigger 28 past the fully actuated configuration.

When the user releases the trigger 26, or sufficiently decreases pressure applied to the pressing surface 62, the biasing return force applied by the torsion spring 68 can move the trigger 28 back into the rest position. Accordingly, the repulsive force between the first and second magnets 64, 78 can decrease, as can the pressing force applied to the pivoting linkage 76 by the second magnet 78, and the pivoting linkage can return to the unactuated configuration.

Figure 9:
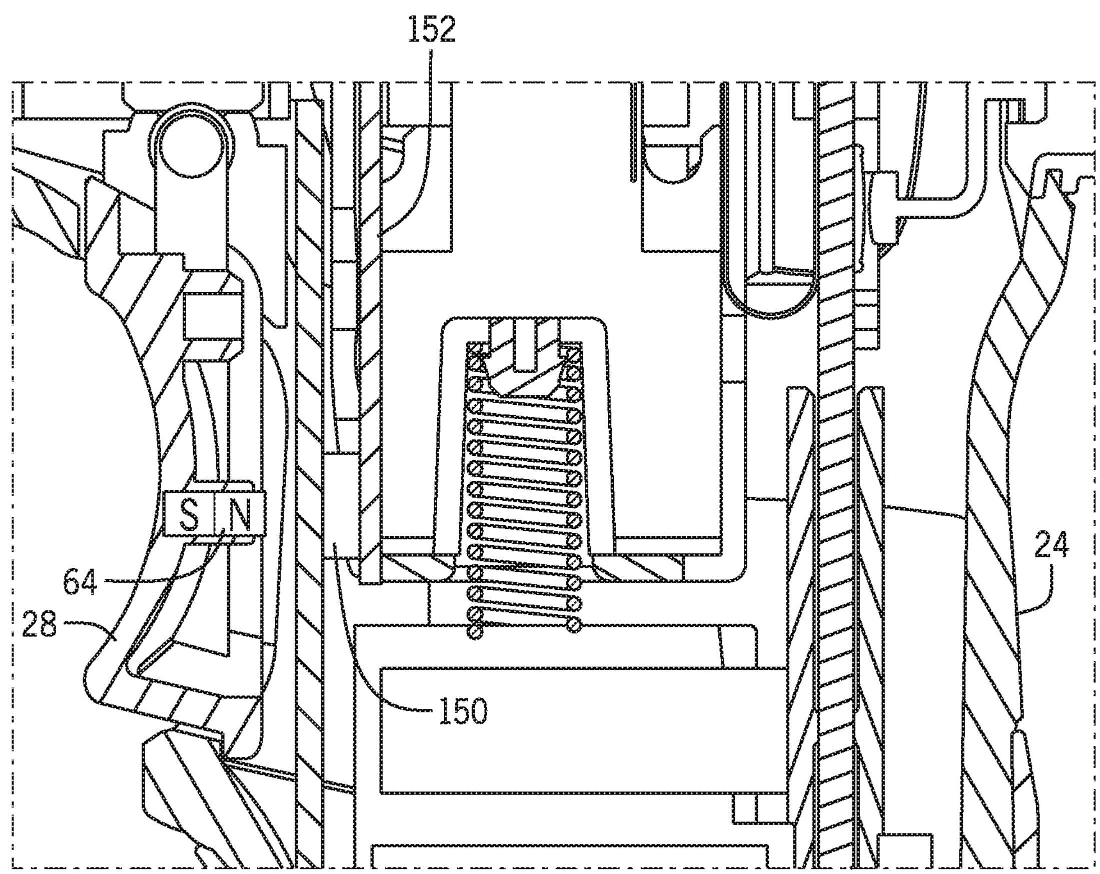
FIG. 9 is a cross-sectional partial view of a scanner according to another embodiment of the invention.
Figure 10:
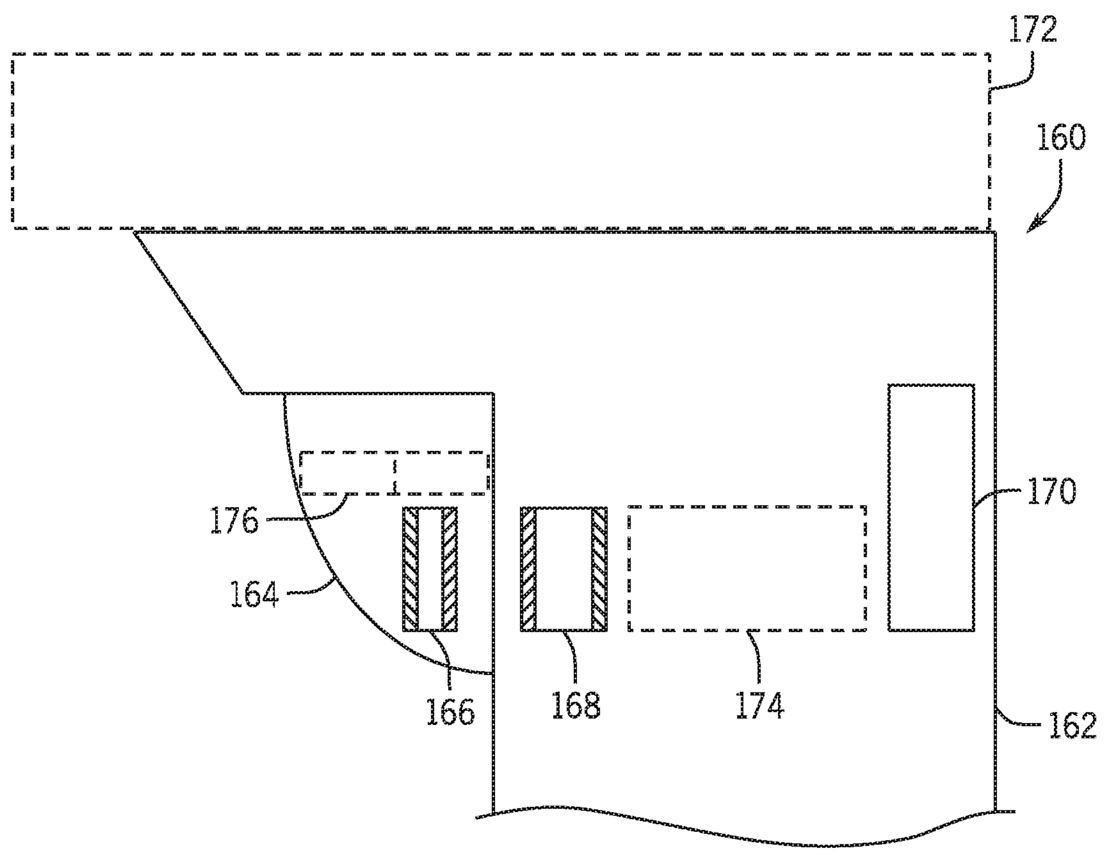
FIG. 10 is a schematic partial view of a scanner according to still another embodiment of the invention.

In other embodiments, other configurations are possible. In some embodiments, for example, a PCB or an actuation device can be configured differently than the PCB 90. In some cases, accordingly, a different mechanism may be employed to actuate a device on the PCB based upon actuation of a trigger. In the embodiment illustrated in FIG. 9, for example, an actuation device configured as a reed switch 150 is supported by a PCB 152 that is proximate to the front of the sealed housing 24 near the trigger 28. The reed switch 150 is configured to detect magnetic field of the first magnet 64, the strength of which will increase as the first magnet 64 approaches the reed switch. Once a minimum magnetic field strength is detected, the reed switch 150 can switch into an actuated state. Conversely, the reed switch 150 can return to an unactuated state as the first magnet 64 moves away from the reed switch. Accordingly, when the trigger 28 is pressed by a user, the first magnet 64 can move toward the reed switch 150, as similarly described above, and the reed switch 150 can be actuated. In other embodiments, other types of sensors can be similarly employed, including Hall effect sensors and others As another example, some embodiments of a magnetic trigger arrangement according to the disclosure are illustrated schematically in FIG. 10. In the embodiments illustrated, a sealed system 160 (e.g., a scanning system) includes a sealed housing 162 and a manual trigger 164 that is movably coupled to the exterior of the sealed housing 162. In some embodiments, the manual trigger 164 is configured to move to actuate a device associated with the sealed housing 162, such as a detachable scanner 172, without penetrating the sealed envelope of the sealed housing 162, and without the use of flexible membranes or other sealing elements.

In this regard, in order to transmit actuation force into the sealed housing 162, an external magnet 166 is positioned outside of the sealed housing 162 and is configured to move in response to movement of the manual trigger 164. Further, an internal magnet 168 is positioned within the sealed housing 162, with the magnetic moment of the internal magnet 168 aligned in substantially the opposite direction to the magnetic moment of the external magnet 166. Thus arranged, the internal and external magnets 168, 166 can exert a repulsive force on each other, which can increase with the proximity of the magnets 166, 168 to each other. Correspondingly, the internal magnet 168 can be movable by the exterior magnet 166, in response to actuation of the manual trigger 164, in order to selectively actuate an actuation device 170 within the sealed housing 162 without disturbing the seal of the sealed housing 162.

In different embodiments the actuation device 170 can take various forms and can be used for various functionality, including activating scanning functionality, activating power on/off, or effecting any other suitable function. In some embodiments, a detachable system, such as the detachable scanner 172, can be removably coupled to the sealed housing 162 and can be configured to be controlled by the actuation device 170.

In some embodiments, the sealed housing 162 can include a linking structure 174 to transfer force from the interior magnet 168 to the actuation device 170. For example, the linking structure 174 can include a pivoting linkage, such as the pivoting linkage 76, a sliding body, a spring, or any other device that is operable to transfer force between the magnet and the switch/actuation device. In some embodiments, the linking structure 174 can be configured to transfer force from the actuating device 170 back to the manual trigger 164, to provide tactile feedback to a user, or to help to return the manual trigger 164 to a resting configuration.

In some embodiments, a biasing device, such as an external biasing device 176, can be included to provide a return force or tactile feedback to the manual trigger 164. In some embodiments, for example, the external biasing device 176 can be configured as a mechanical spring, or as a magnetic arrangement separate from the magnets 166, 168.

In some of the examples above, actuation of magnetic trigger arrangements is effected by a pistol-style triggers, which can be pulled or pressed by a user. In other embodiments, other configurations are possible. For example, in some embodiments, a trigger can be configured as a button, a switch, a lever, or another manually manipulated mechanism.

Similarly, in some of the examples above, actuation force is transmitted into a sealed housing via repulsive magnetic forces. In some embodiments, internal and external magnets may be oriented so that an attractive force is used to transfer actuation force into a sealed housing.

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A scanning system comprising:
a sealed housing defining a wall;
a trigger that is supported by and external to the sealed housing;
a first magnet that is supported by the trigger, the first magnet being external to the sealed housing so that the first magnet is positioned to one side of the wall of the sealed housing;
a second magnet that is internal to the sealed housing and aligned with the first magnet, the second magnet being positioned to an opposing side of the wall of the sealed housing;
an actuation device within the sealed housing, the actuation device being configured to be actuated to control one or more operations of the scanning system; and
a connecting member that extends between the second magnet and the actuation device,
the trigger being configured to be moved relative to the sealed housing to move the first magnet towards the second magnet, in order to move the second magnet away from the first magnet and thereby transmit an actuation force to the actuation device via the connecting member.

2. The scanning system of claim 1, wherein the first magnet is disposed with a first pole facing the second magnet; and
wherein the second magnet is disposed with a second pole facing the first magnet, the second pole being configured to be repelled by the first pole.

3. The scanning system of claim 2, wherein a first magnetic moment of the first magnet is oriented in a first direction that is one of towards or away from the sealed housing; and
wherein a second magnetic moment of the second magnet oriented in a second direction that is substantially opposite the first direction.

4. The scanning system of claim 1, wherein the scanning system is a symbol scanner.

5. The scanning system of claim 1, wherein the connecting member is configured as a linkage.

6. The scanning system of claim 5, wherein the linkage is a hanging linkage with first and second pivots.

7. The scanning system of claim 1, wherein the connecting member is configured to provide tactile feedback upon actuation of the actuation device.

8. The scanning system of claim 7, wherein the connecting member includes a spring portion configured to flex to provide the tactile feedback.

9. The scanning system of claim 8, wherein the spring portion is included on a hanging linkage, suspended between two pivots.

10. The scanning system of claim 7, further comprising:
a biasing arrangement configured to provide a return force to the trigger separate from the tactile feedback.

11. The scanning system of claim 7, wherein the connecting member is configured with a resonant frequency to modify the tactile feedback.

12. A scanning system comprising:
a sealed housing;
a scanning device configured to be detachably supported by the sealed housing;
a manual trigger supported by the sealed housing;
an actuation device enclosed within the sealed housing, the actuation device being configured to be actuated to control one or more operations of the scanning device; and
a magnetic arrangement configured to actuate the actuation device, the magnetic arrangement including:
a first magnet having a first pole, the first magnet being external to the sealed housing and being configured to be selectively moved by the manual trigger;
a second magnet having a second pole configured to be repelled by the first pole, the second magnet being enclosed by the sealed housing; and
a connecting member that supports the second magnet within the sealed housing, and
the manual trigger is configured to move the first magnet towards the sealed housing, thereby moving the second magnet away from the first magnet to move the connecting member to actuate the actuation device.

13. The scanning system of claim 12, wherein the connecting member includes at least one of a spring, a linkage, and a slider.

14. The scanning system of claim 12, wherein the connecting member includes a linkage with first and second pivots.

15. The scanning system of claim 14, wherein the linkage includes a convolute spring portion supported between the first and second pivots.

16. The scanning system of claim 14, wherein the linkage includes first and second spring arms extending on opposing sides of a support structure within the sealed housing.

17. The scanning system of claim 12, wherein the connecting member is configured to provide tactile feedback upon actuation of the actuation device.

18. A trigger arrangement for a scanning system that includes a scanning device, a sealed housing configured to support the scanning device, and an actuation device configured to control functionality of the scanning device, the trigger arrangement comprising:
a trigger configured to be manually moved relative to the sealed housing;

a first magnet having a first pole, the first magnet being external to the sealed housing and being configured to be selectively moved by the trigger;

a second magnet having a second pole configured to be repelled by the first pole, the second magnet being internal to the sealed housing; and a connecting member that supports the second magnet within the sealed housing, the connecting member being configured to actuate the actuation device when the trigger moves the first magnet towards the second magnet.

19. The trigger arrangement of claim 18, wherein the trigger is formed from a substantially rigid material and is pivotally supported on the sealed housing.

20. The trigger arrangement of claim 18, wherein the connecting member includes a pivoting linkage configured to be moved by the second magnet to actuate the actuation device.

* * * * *